United States Patent [19]

Gassmann

[11] Patent Number: 5,677,938
[45] Date of Patent: Oct. 14, 1997

[54] METHOD FOR FUELING AND OPERATING A NUCLEAR REACTOR CORE

[75] Inventor: William Patrick Gassmann, Downingtown, Pa.

[73] Assignee: PECO Energy Company, Philadelphia, Pa.

[21] Appl. No.: 403,059

[22] Filed: Mar. 13, 1995

[51] Int. Cl.$^6$ .................. G21C 7/06; G21C 19/00
[52] U.S. Cl. .................................. 376/237; 376/267
[58] Field of Search .......................... 376/236–238, 376/241, 267

[56] References Cited

U.S. PATENT DOCUMENTS

| | | | |
|---|---|---|---|
| 3,335,061 | 8/1967 | Winsche et al. | 176/17 |
| 3,385,758 | 5/1968 | Gyorey et al. | 176/33 |
| 3,432,389 | 3/1969 | Stern | 176/40 |
| 3,575,803 | 4/1971 | Greebler | 176/30 |
| 4,285,769 | 8/1981 | Specker et al. | 176/30 |
| 4,326,919 | 4/1982 | Hill | 376/267 |
| 4,460,538 | 7/1984 | Yamashita | 376/267 |
| 4,567,018 | 1/1986 | Enomoto et al. | 376/435 |
| 4,818,474 | 4/1989 | Malhouitre et al. | 376/267 |
| 4,851,181 | 7/1989 | Takeda et al. | 376/267 |
| 4,871,508 | 10/1989 | Lindner | 376/260 |
| 4,914,678 | 4/1990 | Koyama et al. | 376/267 |
| 5,093,070 | 3/1992 | Koyama et al. | 376/267 |
| 5,271,050 | 12/1993 | Nagano et al. | 376/267 |
| 5,272,736 | 12/1993 | Wolters, Jr. et al. | 376/267 |
| 5,307,387 | 4/1994 | Nakajima et al. | 376/267 |

OTHER PUBLICATIONS

Nuclear Technology, vol. 65, (Jun. 1984), pp. 383–394, Zhong et al.
Trans. Am. Nucl. Soc., vol. 30, (1978), p. 336, Piascik et al.

Primary Examiner—Harvey E. Behrend
Attorney, Agent, or Firm—Paul & Paul

[57] ABSTRACT

The present invention relates to method of fueling and operating a nuclear reactor core. Fueling the nuclear reactor core for a power operation cycle includes the steps of designating a central core region, a buckled core region and a peripheral core region, placing at least two fuel assemblies of relatively high reactivity in the fuel cells in the central core region and placing fuel assemblies of relatively low reactivity in the cells in the peripheral core region. The invention further includes operating the nuclear reactor core throughout a cycle of operation by the steps of designating at least one network of control rods, each network comprising approximately one-fourth of the control rods in the core, the selected networks being substantially evenly spread throughout the core, selecting a desired interval for insertion of the selected networks of control rods during the power operation cycle, actuating a substantial portion of a first selected network of control rods to positions at least partially inserted into the core and actuating a substantial portion of all remaining control rods to positions substantially fully withdrawn from said core for the desired interval, and repeating the actuation step, but alternating between selected networks of control rods, for each remaining desired time interval for the duration of the nuclear reactor power operation cycle.

10 Claims, 10 Drawing Sheets

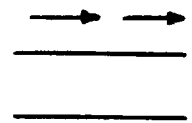
*Fig. IIA*
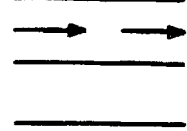
*Fig. IIB*
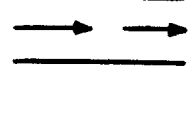
*Fig. IIC*
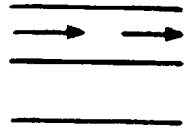
*Fig. IID*

METHOD FOR FUELING AND OPERATING A NUCLEAR REACTOR CORE

BACKGROUND OF THE INVENTION

This invention relates to a design and arrangement of fuel for a nuclear reactor and to a method of operating such an arrangement.

Nuclear fuels contain uranium and/or plutonium in suitable form. In commonly used fuel for light water cooled and moderated nuclear power reactors, the fuel comprises uranium dioxide ($UO_2$) in which about 0.7 to 4.3 percent is fissile U-235 which is mixed with fertile U-238. During operation in the reactor, some of the fertile U-238 is converted to fissile Pu-239 and Pu-241 which contributes to maintenance of reactor power. The U-238 also is fissionable by high energy neutrons in the reactor.

In known boiling water nuclear power reactors, the nuclear fuel typically is in the form of sintered pellets contained in an elongated cladding tube, formed of a suitable metal such as a zirconium alloy, to form a fuel element. The tube, sealed by end plugs, serves to isolate the nuclear fuel from the moderator-coolant and to prevent the release of fission products.

Typically, such fuel elements are arranged in groups and supported between upper and lower tie plates in separately replaceable fuel assemblies or bundles as shown, for example, in U.S. Pat. No. 3,689,358. A sufficient number of fuel assemblies are arranged in a generally symmetric matrix, approximating a right circular cylinder, to form the nuclear reactor core capable of self-sustained fission chain reaction. The core is submerged in a fluid, such as light water, which may serve as both as a working fluid and a neutron moderator.

Nuclear reactors are typically refueled periodically with an excess of reactivity sufficient to maintain operation throughout an operating cycle often on the order of one to two years. The reactor is then shut down and a fraction of the fuel assemblies, typically one quarter to one-third, are replaced. Subsequently, all or most of the fuel is then typically relocated within the core. The excess reactivity at the beginning of a cycle of operation requires a control system of sufficient strength to maintain the effective multiplication factor at unity during reactor operation. The control system customarily comprises neutron absorbing materials that serve to control the neutron population by nonfission absorption of neutrons.

Typically, the control system includes mechanical control in the form of a plurality of control rods arranged in a matrix, containing neutron absorbing material, which are selectively insertable in the spaces or gaps among the fuel assemblies to control the reactivity, and hence the power level of operation, of the core. In typical arrangements, the control rods have a cross or cruciform transverse cross-sectional area whereby the blade wings of each control rod are insertable in the spaces between an adjacent four fuel assemblies. Generally, four fuel assemblies surround each control rod and each set of four fuel assemblies and a control rod constitutes a core cell.

The control system typically also includes a burnable neutron absorber, such as gadolinium, blended with some of the fuel. The naturally occurring Gd-155 and Gd-157 isotopes are strong neutron absorbers which are converted by neutron absorption to isotopes of lesser control worth (neutron absorbing capacity). Such use of burnable absorbers decreases the amount of mechanical control required and, by appropriate axial and radial arrangement of the burnable absorber, improvements in power distribution can be achieved. Frequently such burnable absorbers are incorporated in a mixture with selected portions of nuclear fuel in several fuel elements of each assembly.

Early in the design and operation of nuclear power reactors of the type under discussion, procedures and methods for core loading pattern design and control rod insertion and withdrawal (control rod programming) were developed. This control rod programming approach attempts to distribute the fuel burn-up, controlled fuel depletion, and control rod history effects as evenly as possible among the fuel assemblies of the core by frequent, periodic revision and interchange (swapping) of control rod patterns. Using this method of core design and operation for reactors of the type described, the control rods are arranged in several alternating patterns which permit one group of control rods to be swapped for another during operation. These usually consist of four patterns of control rods which alternately are inserted in the reactor core for power shape and burnup reactivity control. In accordance with the known control rod operating procedures, the core is operated with a given control rod pattern for a relatively short period of energy generation. Power is then reduced and the given control rod pattern is exchanged or swapped for another pattern, etc. Such control rod programming is discussed in greater detail in, for example, U.S. Pat. No. 3,385,758 to Gyorey, et al. This method of core design and operation causes most of the fuel to experience adjacent control rod movement at power at intervals during each operating cycle.

This undesirably large number of control rod pattern exchanges that is required during the operating cycle results in an increase in operational complexity and potential for operator error. Furthermore, the reactor power reduction necessitated by each of these control rod pattern exchanges results in a decrease in overall plant capacity factor due to the need to reduce reactor power throughout the duration of the exchange, and thus further results in an increase in fuel cycle costs. Also, the large number of control rods which are inserted at intervals during power operation throughout the operating cycle may result in a control blade burnup penalty, as relatively larger numbers of control blades are depleted past their end-of-life criteria.

Furthermore, frequent control rod pattern swaps excite spatial power distribution xenon transients which reduce margin to fuel licensing thermal limits and limits related to fuel reliability.

Another method of core loading pattern design and control rod programming for the type of nuclear power reactors under discussion is presented in U.S. Pat. No. 4,285,769 to Specker. Using this design method, certain core cells are defined as being those which will experience control rod insertion at power during the operating cycle. These control cells are then loaded with fuel of relatively low reactivity. In this way, usually only one group of control rods is used for power shape and burnup reactivity control.

This design method results in a decrease in core neutronic efficiency due to the prohibition on loading high reactivity fuel in certain centrally located core cells. More high reactivity fuel must therefore be loaded nearer the core periphery, resulting in a neutron leakage increase and neutronic efficiency decrease. Relatively large amounts of fresh fuel must be loaded for each operating cycle, resulting in an increase in fuel cycle costs. This also results in an increase in the amount of spent fuel which is discharged and which must therefore be stored and disposed of. The core neutron leakage increase results also in an increased rate of neutron exposure and embrittlement of reactor pressure vessel internals such as the core shroud and jet pump assemblies. The fuel reliability risk is also potentially increased due to the control rod motion adjacent to high burnup fuel which may be more susceptible than low burnup fuel to damage resulting from power or reactivity insertion transients.

SUMMARY OF THE INVENTION

The core of a boiling water reactor includes both fuel assemblies and control rods. The fuel assemblies contain the uranium dioxide fuel which is used to sustain the nuclear chain reaction. The control rods contain material which slows the nuclear chain reaction, and are moved into and out of the core as necessary during the nuclear fuel cycle to regulate the reactor power level. Water flows through the core and is boiled; the resulting steam is used to turn a turbine and generate electricity. This process continues throughout the nuclear fuel cycle (approximately 12 to 24 months), at which time the reactor is shut down and fresh nuclear assemblies and control rods are put into the core to replace those which have reached the end of their useful life.

One preferred embodiment of the present invention relates to method of fueling and operating a nuclear reactor core having a plurality of fuel cells arranged in a generally symmetric matrix having a single central point of symmetry at the center of the core. Each cell includes a plurality of individually replaceable fuel assemblies and a selectively insertable control rod and each fuel assembly has a plurality of fuel rods. The fuel assemblies surround the control rod in each cell. In the present invention, fueling the nuclear reactor core for a power operation cycle can comprise the steps of: shutting down the reactor after a successive cycle of periodic operation for replacement of a fraction of the fuel assemblies in the core and relocation of a fraction of the fuel assemblies in the core, designating a central core region, a buckled core region and a peripheral core region, placing at least two fuel assemblies of relatively high reactivity in substantially all fuel cells in the central core region, and placing fuel assemblies of relatively low reactivity in the cells in the peripheral core region. The invention can further include operating the nuclear reactor core throughout a cycle of operation by the steps of designating at least one network of control rods, each network comprising approximately one-fourth of the control rods in the core, the selected networks being substantially evenly spread throughout the core, selecting a desired interval for insertion of the selected networks of control rods during the power operation cycle, actuating a substantial portion of a first selected network of control rods to positions at least partially inserted into the core and actuating a substantial portion of all remaining control rods to positions substantially fully withdrawn from said core for the desired time duration, and repeating the actuation step, but alternating between selected networks of control rods, for each remaining desired interval for the duration of the nuclear reactor power operation cycle.

An object of the invention is to provide a method of core design and core operation for a boiling water nuclear reactor which results in high neutronic efficiency and efficient fuel utilization.

A further object is to provide a method of core design and core operation which involves low levels of operational complexity.

A further object is to provide a method of core design and core operation which allows reactor operation with high capacity factor.

A further object is to provide a method of core design and core operation which involves a small control rod burnup penalty and efficient control rod lifetime utilization.

A further object is to provide a method of core design and core operation which minimizes the amount of spent fuel which must be disposed of.

A further object is to provide a method of core design and core operation which improves fuel reliability.

A further object is to provide a method of core design and core operation which minimizes neutron exposure and subsequent damage to susceptible reactor pressure vessel internal structures.

A further object is to provide a method of core design and core operation which lends itself to efficient power suppression of failed nuclear fuel pins via control rod insertion.

A further object is to provide a method of core design and core operation which maintains control rod pattern octant symmetry in order to allow for optimal nuclear instrumentation and process computer reliability and accuracy.

A further object is to provide a method of core design and core operation which lends itself to techniques for improvement of thermal limit margins and extension of reactor full power operation capability.

BRIEF DESCRIPTION OF THE DRAWINGS

FIGS. 11A, 11B, 11C, and 11D indicate simplified, representative, cross-sectional plan views, each of one quarter of a nuclear reactor core as employed in the reactor of FIGS. 1 and 2, wherein typical control rod positions are indicated corresponding to the control rod group definitions of FIGS. 6-7, indicating control rod position in the core.

DESCRIPTION OF THE PREFERRED EMBODIMENT

Figure 1:
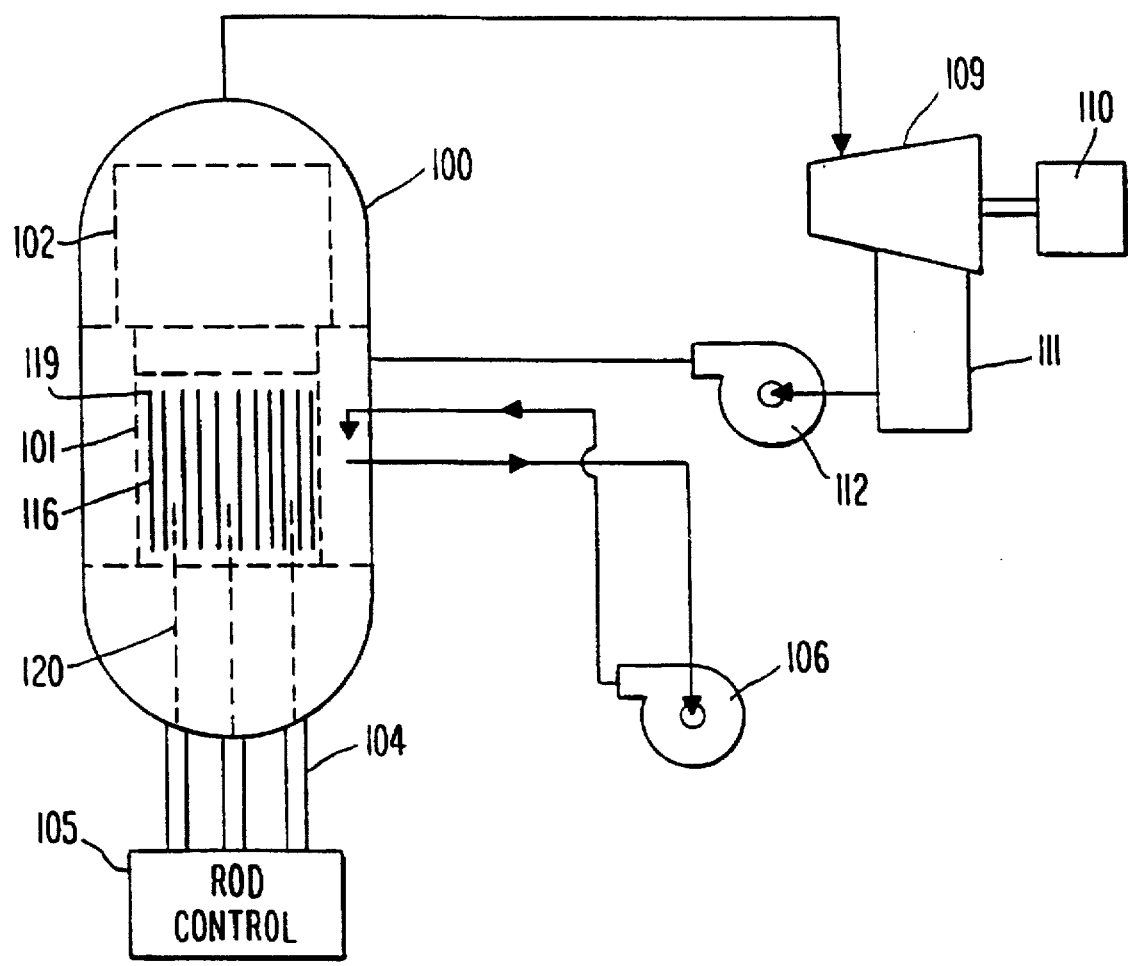
FIG. 1 is a simplified schematic diagram of a boiling water nuclear reactor power plant as applicable to the present invention.
Figure 2:
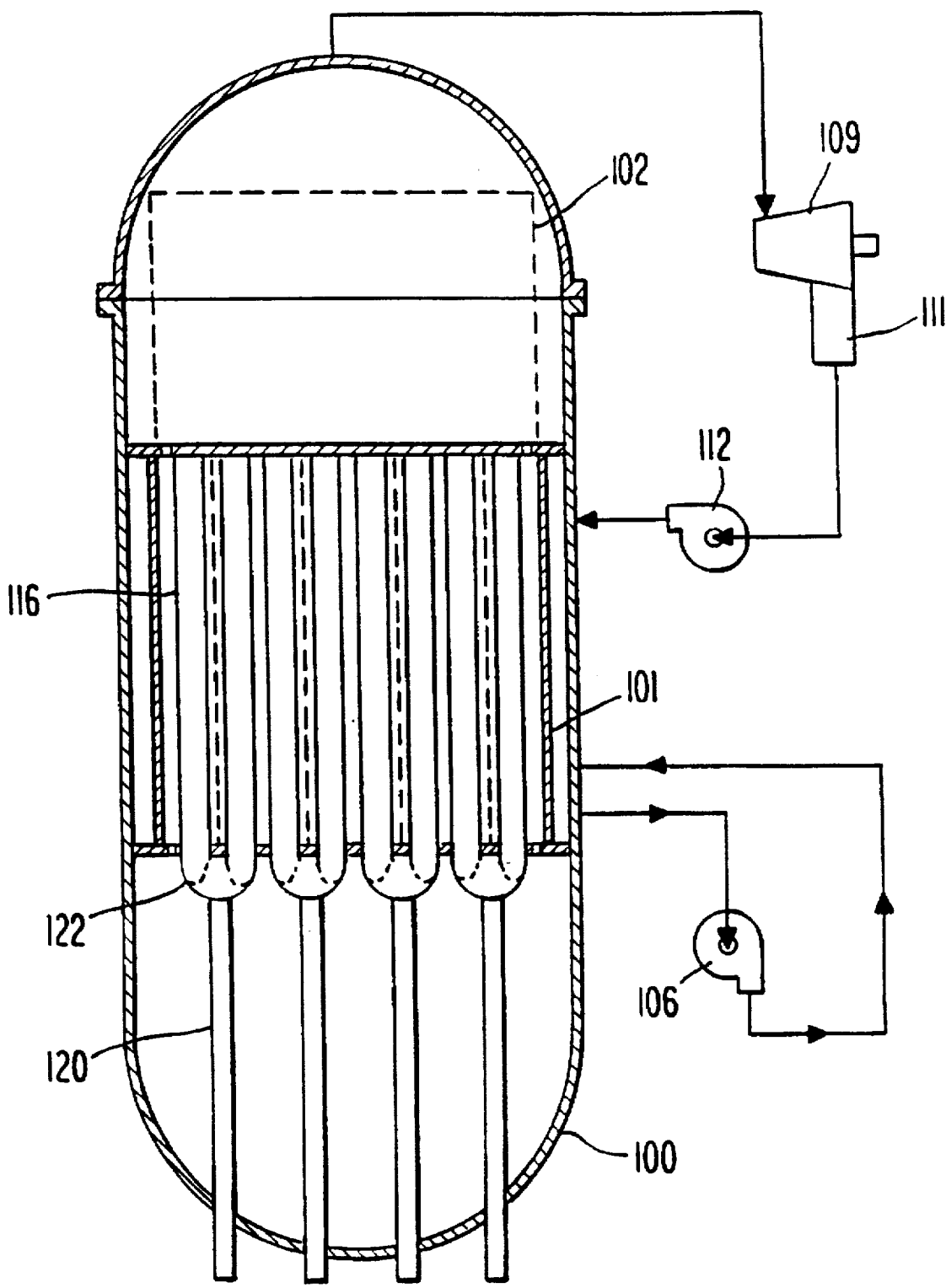
FIG. 2 is a schematic diagram of the boiling water nuclear reactor power plant of FIG. 1, indicating further detail of the reactor core.

Although not limited thereto, the invention is described herein as applied to a boiling water nuclear reactor. Referring now in detail to the drawings, wherein like reference numerals indicate like elements throughout the figures, there is shown in FIGS. 1 and 2 a typical boiling water reactor which contains a pressure vessel 100, a core of nuclear fuel assemblies 116 and a steam separating and drying apparatus 102. The pressure vessel 100 is filled With coolant to a level above the core 101. The coolant is circulated through the core 101 by recirculation pumps 106 which force the coolant upward through the fuel assemblies 116 of the reactor core 101. The heat produced by the nuclear reaction of the fuel is transferred to the coolant such that steam is collected in the upper portion of the reactor pressure vessel 100. The steam is applied to a turbine 109 which drives an electrical generator 110. The turbine exhausts to a condenser 111 and the resulting condensate is returned as feed water to the pressure vessel 100 by feed water pumps 112.

Figure 3:
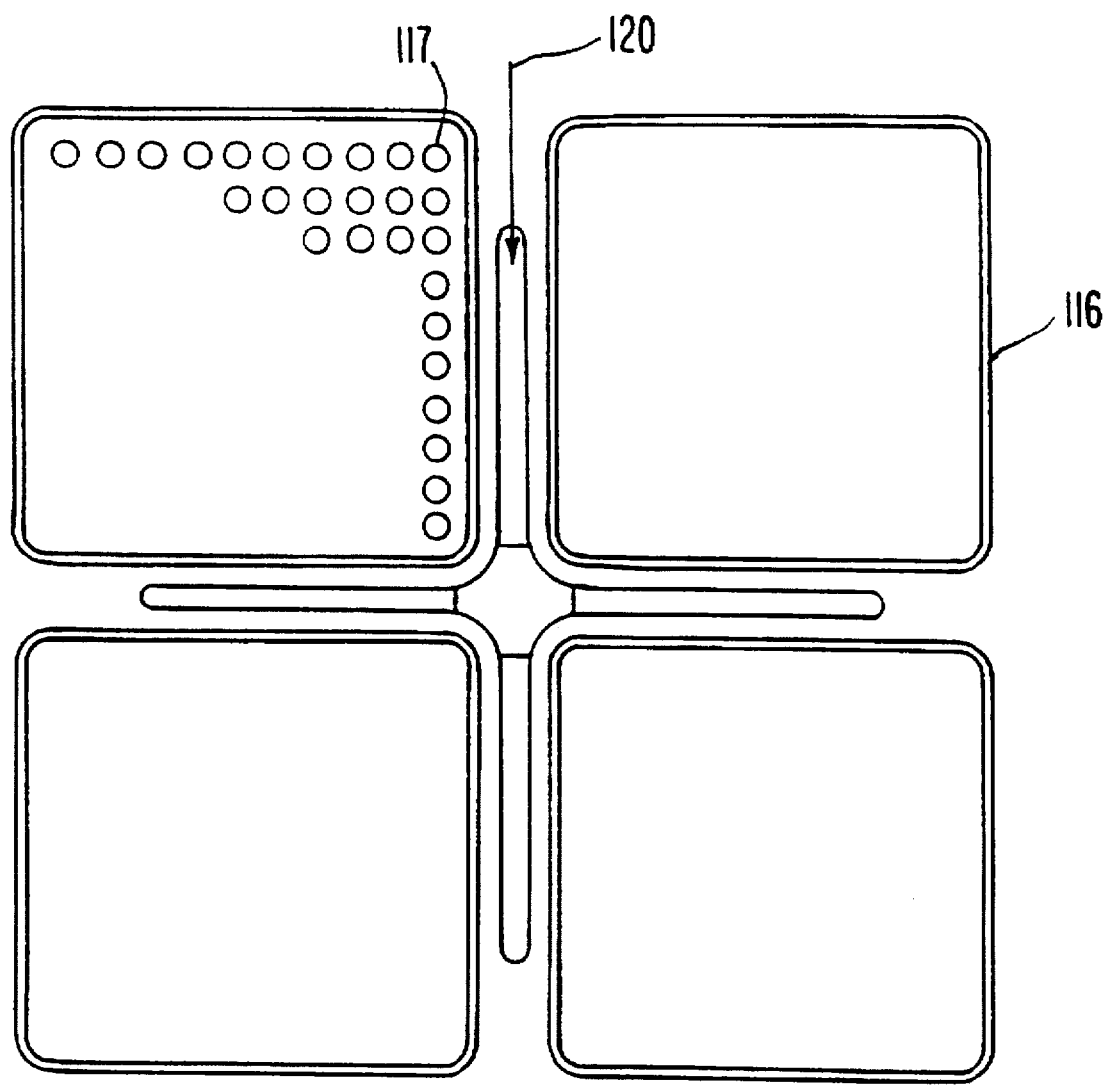
FIG. 3 is a simplified, transverse sectional view of four typical adjacent fuel assemblies, utilizing a ten-by-ten array of fuel rods, as employed in the reactor of FIGS. 1 and 2.
Figure 4:
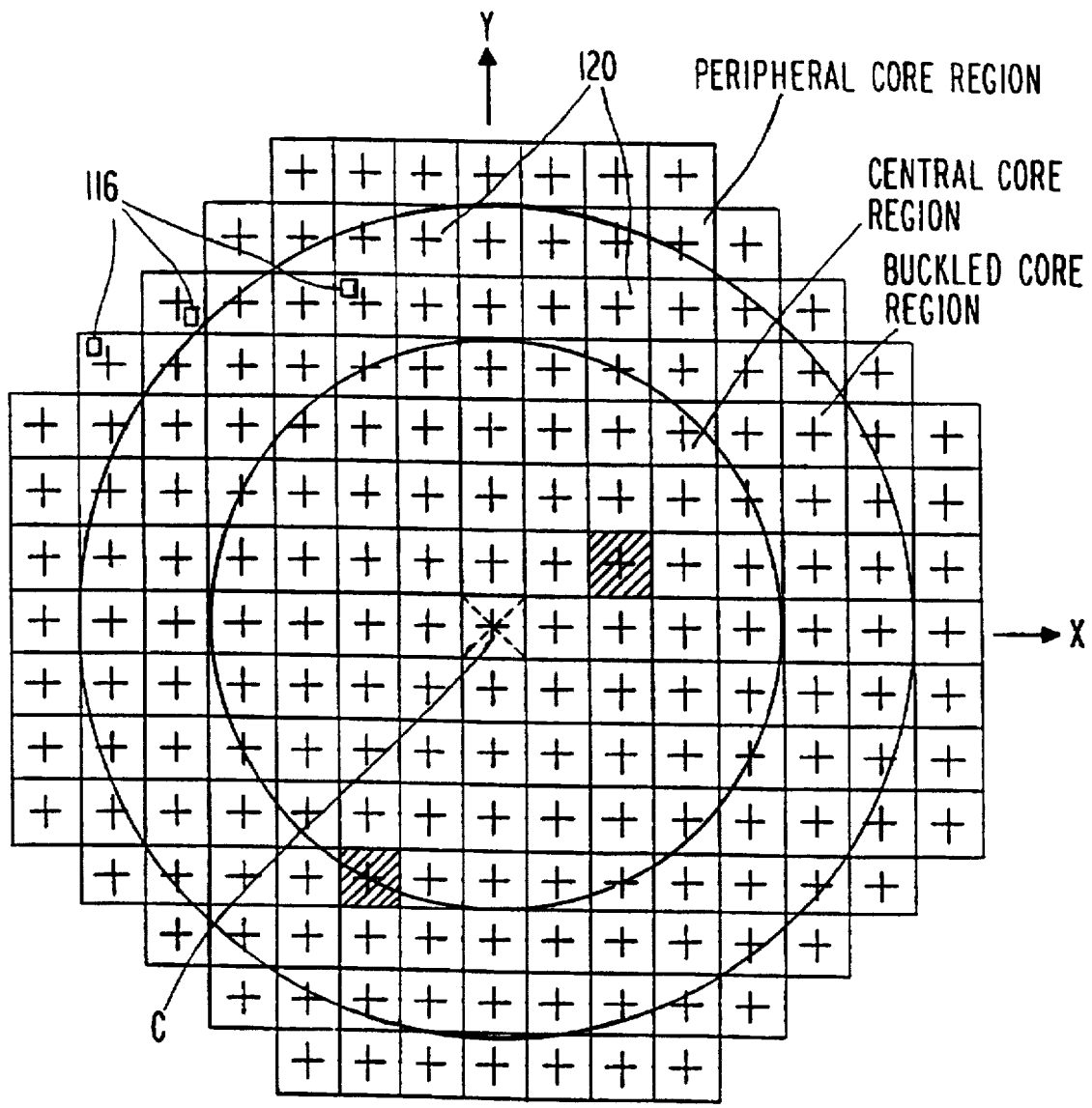
FIG. 4 is a simplified, representative, cross-sectional plan view of a nuclear reactor core as employed in the reactor of FIGS. 1 and 2, indicating the central core region and the buckled core region in accordance with the present invention.
Figure 5:
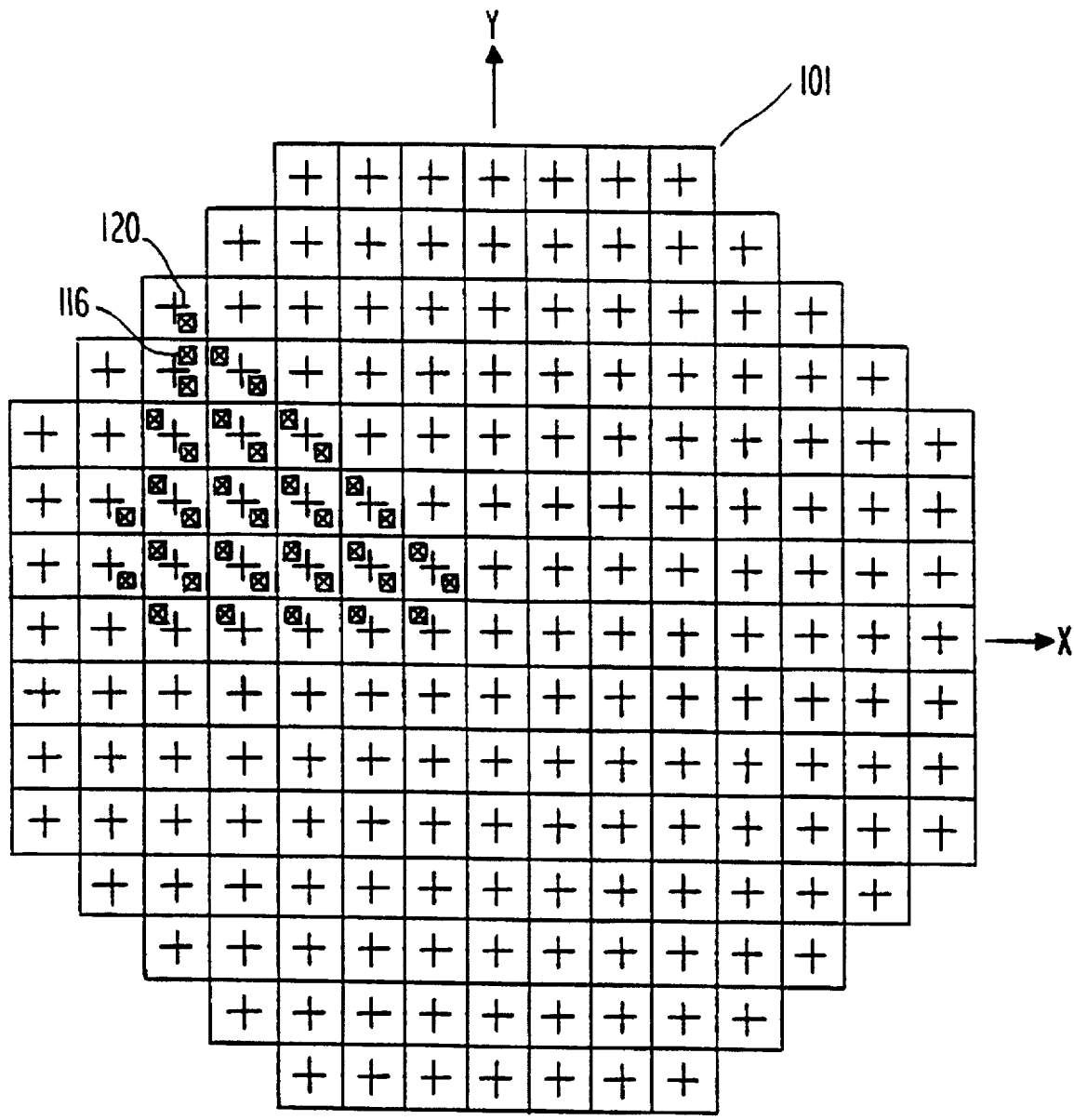
FIG. 5 is a simplified, representative, cross-sectional plan view of a nuclear reactor core as employed in the reactor of FIGS. 1 and 2 indicating 252 typical fresh fuel bundle improved low leakage core loading pattern locations (indicated in only one-eighth of the core) in accordance with the present invention.
Figure 7:
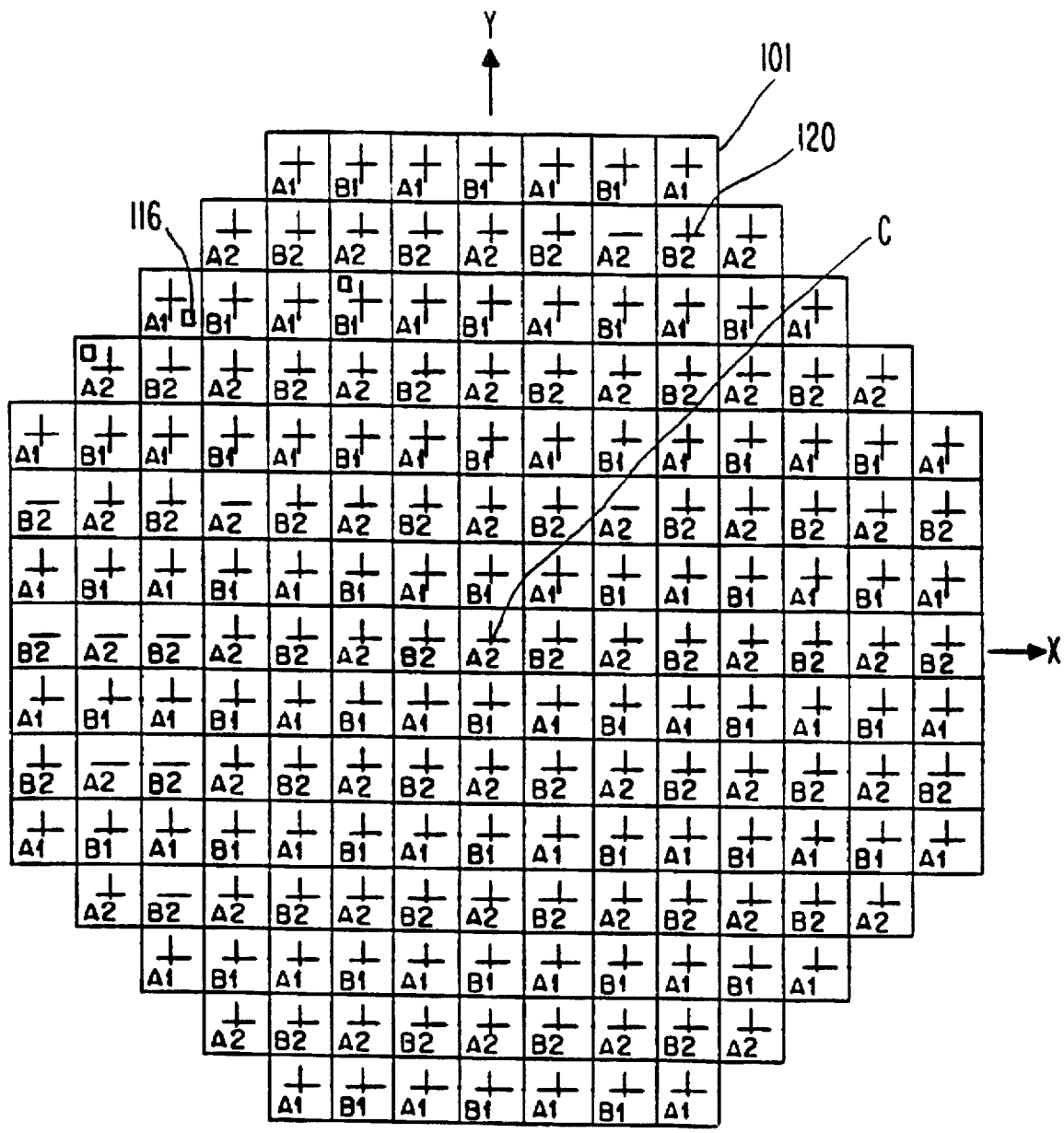
FIG. 7 is a simplified, representative, cross-sectional plan view of a full nuclear reactor core as employed in the reactor of FIGS. 1 and 2, wherein control rods are divided into four groups—A1, A2, B1, B2 and having a cell as a central point of symmetry.

A plurality of selectively insertable control rods 120, as shown in FIGS. 1-3 and in FIGS. 4, 5, and 7 in simplified cross-sectional views, which may be driven axially into and out of the core 101 between nuclear fuel assemblies 116 by a drive device 104 (see FIG. 1) are used as a means to control the reactivity of the core 101. Typically, the nuclear fuel is provided as fuel pellets within elongated rods 117 with a cladding of corrosion resistant, non-reactive material. The fuel rods 117 are grouped at fixed distances from each other in the coolant flow channel as a fuel assembly 116 (see FIG. 3). A sufficient number of fuel assemblies 116 are arranged in a spaced array such that a nuclear reactor core 101 is formed that is capable of a self-sustained nuclear chain reaction. Sufficient space is provided between the fuel assemblies 116 to allow clearance for control rods 120 and monitoring devices. A rod control system 105 controls the drive devices 104.

A reactor of the type described is refueled periodically with a partial batch of fresh fuel which comprises some part of the core 101. Typically, the reactor is operated for 12 to 24 months between refuelings, depending on the utility electrical generation requirements (which in turn determines refueling batch size and fuel enrichment). These intervals of operation between refuelings are called "fuel cycles" or "cycles of operation".

In early boiling water reactors, fuel assemblies 116 were designed in 6×6 lattices. Since that time, these lattices have progressed to 7×7, 8×8, 9×9, and 10×10. The early designs, e.g. 6×6 and 7×7, were mechanically sturdy and durable due to large diameter fuel rods 117, thicker cladding, etc. However, it has been recognized that lattices with larger numbers of smaller pins, e.g. 9×9 and 10×10 arrays, are much more efficient neutronically in that these lattices provide a significantly more optimized fuel/coolant mixture.

For the present invention, a typical fuel assembly 116 is formed by a nine by nine array or higher of closely spaced fuel rods 117 (see FIG. 3 which shows a ten-by-ten array), the fuel rods 117 being, for example, circular in cross section, approximately thirteen feet in length, and approximately four-tenths inch in diameter.

Due to the high cost of nuclear fuel, it is desirable to keep the number of fuel bundles procured for a given cycle to a minimum. The less neutronically efficient designs of the 6×6, 7×7, and 8×8 lattices have generally been phased out in favor of the more neutronically efficient 9×9 and 10×10 lattices. Improved mechanical design and fabrication techniques of fuel rods 117 and fuel assemblies 116 have been developed to enable use of the more efficient 9×9 and 10×10 designs. These improvements include the following:

Improved fuel cladding manufacturing technology, including the use of superior, thinner materials and improved fabrication techniques has resulted in improved strength, corrosion resistance, and resistance to irradiation damage of the new thinner cladding. Fuel rod 117 performance has also been improved by advances in fuel pellet materials, manufacturing technology, and fabrication techniques, which have improved resistance to pellet growth and swelling and irradiation damage of the new thinner pellets.

Improved mechanical design of the fuel assemblies 116, involving for instance use of more spacers in the assembly, allows larger numbers of fuel rods to be employed in the design. These spacers are thin, spring-loaded metal components located at intervals up the bundle which maintain rod-to-rod spacing and minimize coolant flow induced rod vibration. Furthermore, the use of techniques to reduce two-phase flow pressure drop has improved bundle thermal-hydraulic stability performance to allow use of extra spacers, where stability may be characterized briefly as the tendency of an assembly design to initiate and sustain coupled neutronic/thermal-hydraulic power oscillations.

The use of larger numbers of improved spacers and other techniques to improve rod spacing and vibration performance allows larger numbers of thinner fuel rods 117, i.e. 9×9 and 10×10, to be accommodated in the fuel assembly lattice without increasing the likelihood of excessive coolant flow induced vibration or rod bow.

Taken as a whole, the choice of locations of the nuclear fuel assemblies 116 in the core 101 for a given nuclear fuel cycle is referred to as the core loading pattern. The choice and number of control rods 120 which are inserted into the core 101 during operation at power during a given nuclear fuel cycle, and the length of time of such insertion is referred to as control rod programming. The method used to determine the core loading pattern and the method used to determine the control rod programming are the two aspects of boiling water reactor core design which have the greatest impact on the economic performance of the reactor. Due to the high cost of nuclear fuel assemblies 116, control rods 120, and replacement power (required when the reactor is unavailable for full power operation due to control rod programming complexity), it is desirable to ensure that the core loading pattern and control rod programming are designed as efficiently as possible. The present invention, by using a unique combination of core loading pattern and control rod programming, optimizes the core loading pattern with the control rod programming such that a nuclear reactor can be operated safely and at significantly higher efficiency and lower cost than in the past.

Core Loading Pattern

It has long been assumed in the boiling water reactor industry that either control cell core design, as described in U.S. Pat. No. 4,285,769, or conventional core design, as described in, for example, U.S. Pat. No. 3,385,758 and *Nuclear Reactor Analysis*, by James J. Duderstadt and Louis J. Hamilton, "Refueling Patterns—Scatter Loading", John Wiley & Sons, 1976, at 598–600, must be selected and implemented for a given nuclear fuel cycle, with the attendant advantages and disadvantages inherent in the particular method selected. The present invention, hereinafter referred to as improved low leakage core design, is a new method of boiling water reactor core design which is unique in that it incorporates the advantages of conventional core design and control cell core design while substantially lessening their respective disadvantages. As such, it is a more efficient, and therefore more economically beneficial core design method than any known to be implemented to date.

The improved low leakage core design core loading pattern places a large number of fresh fuel assemblies 116 in the central, high importance, region of the core 101, and thus involves a high degree of neutronic efficiency. For purposes of the present invention, the regions of the core 101 may be defined as follows. As can be seen in FIG. 4, the central core region is a circular cross-sectional region which may be approximately one-fourth to three-fourths of the core cross-sectional area, typically about one-third of the cross sectional area of the core 101. A buckled region, which may also be approximately one-fourth to three-fourths of the core cross-sectional area and again typically approximately one-third of the core cross sectional area is an annular ring-shaped cross-sectional area surrounding the central core region. Finally, the peripheral region of the core 101 is an annular-ring shaped cross-sectional area which may also be approximately one-fourth to three-fourths of the core area and also is typically one-third of the cross-sectional area of the core 101. The size of these areas depends upon refueling batch size and the relative reactivity characteristics of the available fuel assembly inventory and may change accordingly.

In accordance with a preferred embodiment of the present invention, the cells of highest importance, i.e. the cells in the central core region typically contain at least two relatively high reactivity fuel assemblies 116. See FIG. 5 where the relatively high reactivity fuel assemblies 116 are shown loaded in one-eighth of the central core region. The remaining seven octants are typically symmetrically loaded. However, it is possible that three or four of the fuel assemblies 116 in certain cells in this region of the core may be of relatively high reactivity. These relatively high reactivity fuel assemblies 116 may typically have, at the beginning of an operating cycle, a reactivity equivalent to a fresh fuel enrichment of approximately 3.4 to 4.3 weight percent fissile material with commensurate burnable poison loading. These fuel assemblies 116 will, in general, be in their initial cycle of irradiation. The remainder of the locations in the central core region may typically contain relatively lower reactivity fuel assemblies 116. These relatively lower reactivity fuel assemblies 116 typically may have, at the beginning of operating cycle, a reactivity equivalent to a fresh fuel enrichment of approximately 1.0 to 3.0 weight per cent fissile material, with commensurate burnable poison loading. These fuel assemblies 116 will, in general, be in their second cycle of irradiation or later.

This method of cell and core loading pattern development may be employed in the core regions increasingly distant from the core center, until sufficient relatively high reactivity fuel has been loaded to satisfy fuel cycle energy requirements. The remainder of the core 101 may then, in general, be loaded with roughly concentric rings of increasingly lower reactivity fuel, up to and including the peripheral region of the core 101. The core 101 periphery may typically be loaded with the lowest reactivity fuel. This fuel will typically have undergone multiple cycles of irradiation, and will have a beginning of operating cycle reactivity equivalent to a fresh fuel enrichment of approximately 0.7 to 1.8 weight per cent fissile material with commensurate burnable poison loading.

Thus, from the above description, it can be seen that the average cell reactivity and fissile material content may be at a maximum at or near the geometric center of the core 101 and will, in general, decrease with increasing distance from the core center, reaching a minimum at the core periphery, consistent with thermal margin, reactivity, and fuel reliability constraints.

For initial core design applications, it is of course necessary to fabricate a fresh fuel assembly inventory which approximates the reactivity characteristics of the fuel as described in the preceding paragraphs.

Control Rod Programming

The present invention involves the unique combination of the above neutronically efficient core loading pattern with extremely efficient control rod programming.

Figure 6:
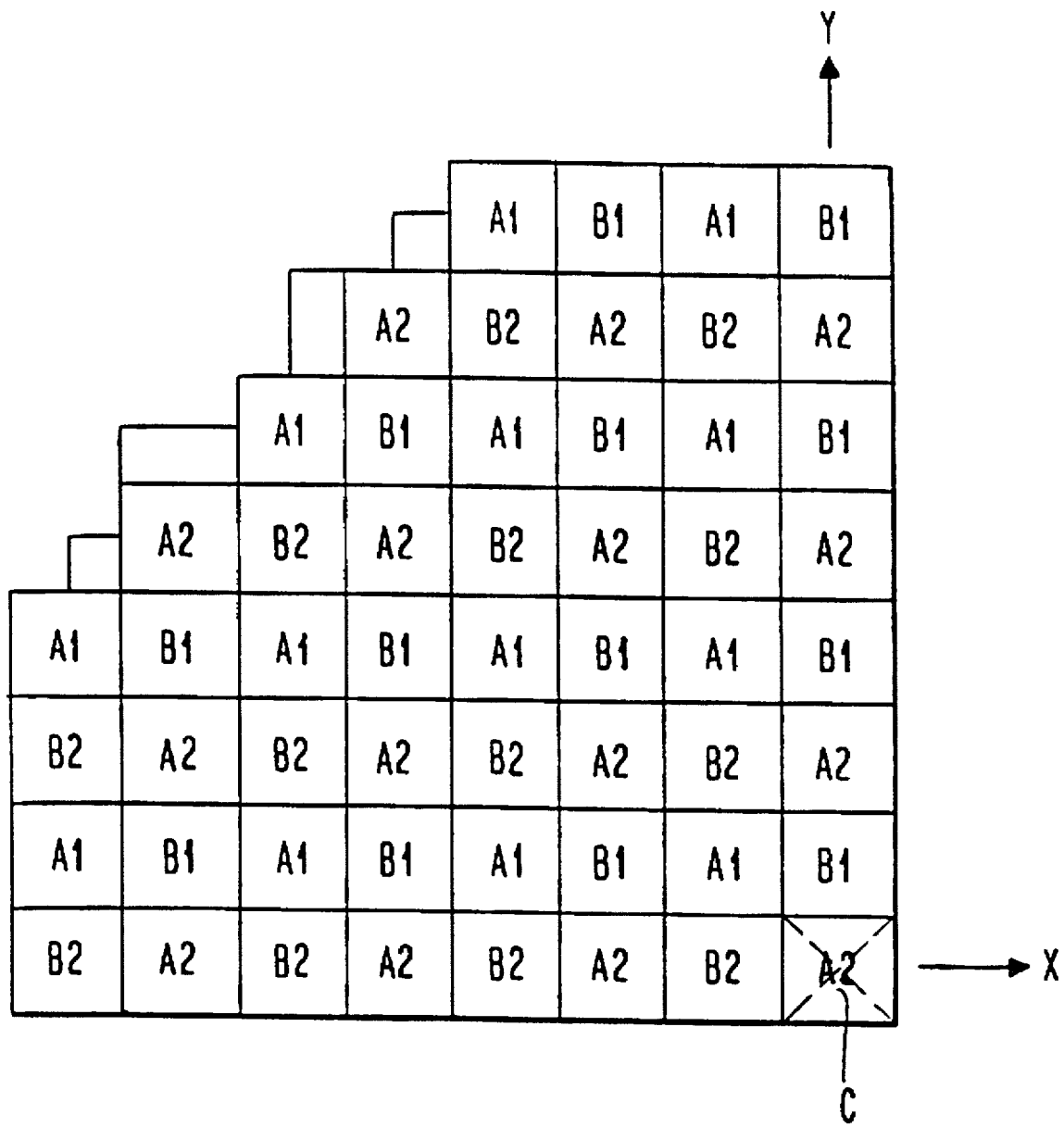
FIG. 6 is a simplified, representative, cross-sectional plan view of one quarter of a nuclear reactor core as employed in the reactor of FIGS. 1 and 2, wherein control rods are shown divided into the four groups—A1, A2, B1, and B2.
Figure 9:
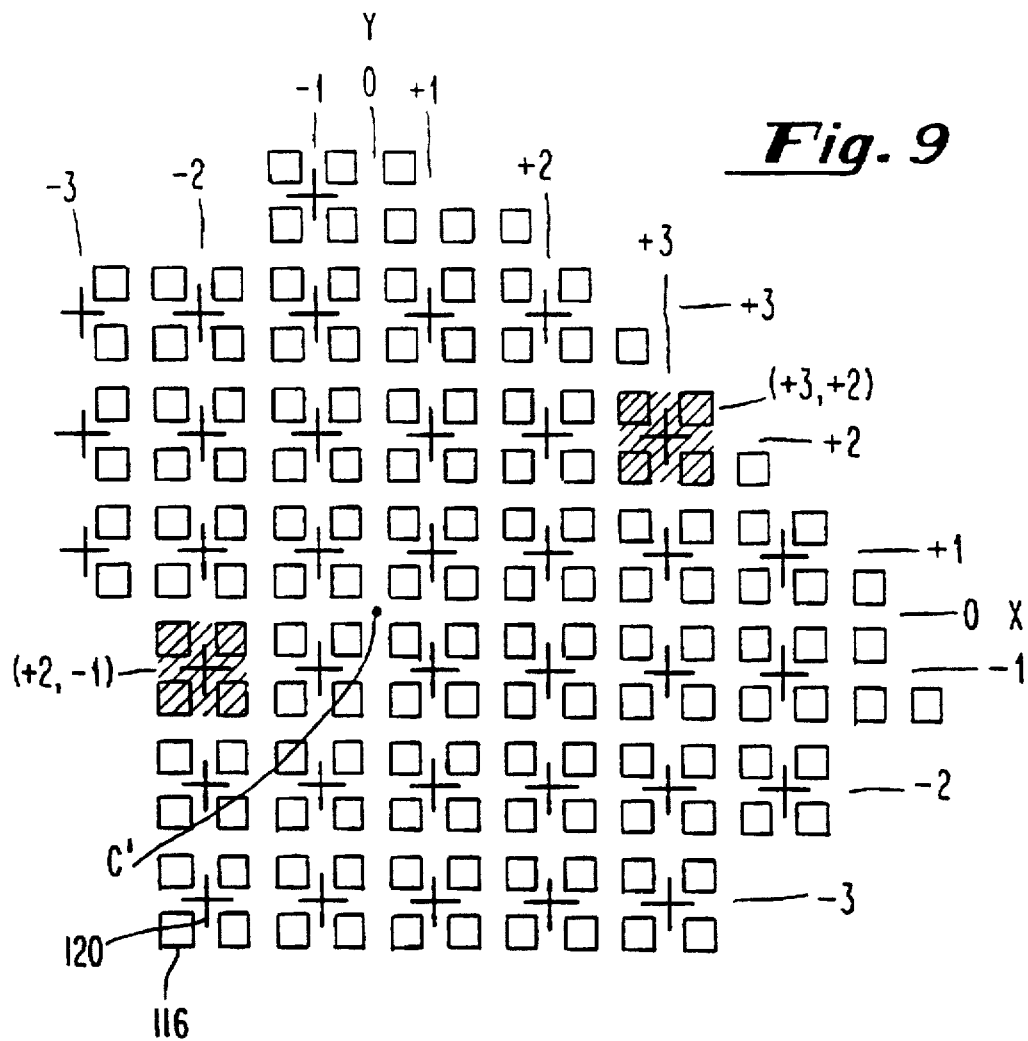
FIG. 9 is a partial, simplified, representative, cross-sectional plan view of a nuclear reactor core as employed in the reactor of FIG. 1 and 2, wherein a central point of symmetry is indicated where there is no cell at the point of symmetry.
Figure 8:
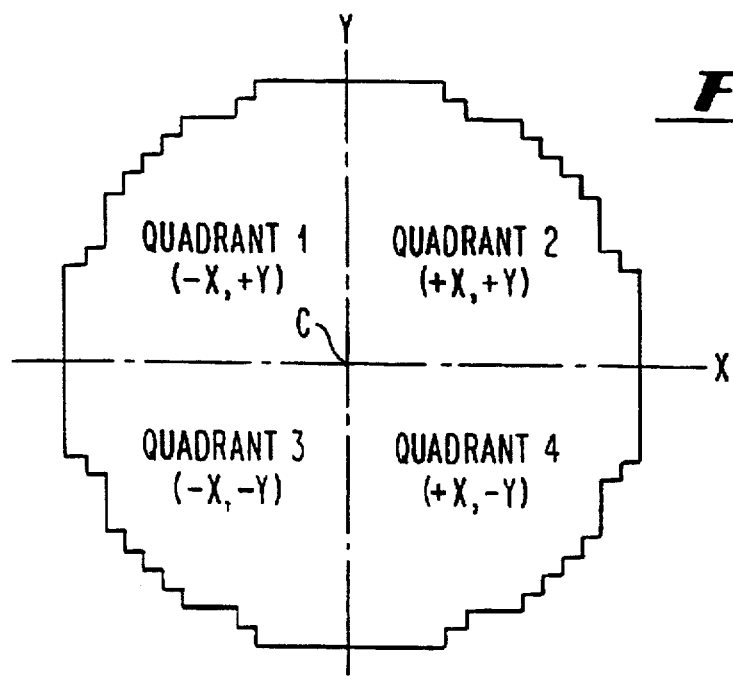
FIG. 8 is a simplified, representative, cross-sectional plan view of a nuclear reactor core as employed in the reactor of FIGS. 1 and 2, indicating an X,Y coordinate system as employed in the present invention.

In accordance with the preferred embodiment of the present invention, control rod programming will be defined by dividing the control rods 120 in each cell into four groups, A1, A2, B1, and B2 within the nuclear reactor and then moving generally only the control rods 120 in those cells in particular patterns relative to the core as loaded above. As can be seen in FIG. 6, where a simplified view of one-fourth of a typical nuclear reactor core is shown, the A2 cell in the lower, right hand corner of the figure indicates the center of the core. In this figure, the core is symmetric about this single cell, with its central point labeled C. However, it is understood that the core may also be symmetric about a group of four central cells as shown in FIG. 9 as C'. In the present invention, this central point of symmetry will be considered the 0,0 point on the X-Y axis indicated in FIGS. 4 and 6–8 where there is a cell at the center point of the core. Where four cells make up the center point of the core, as shown in FIG. 9, the corner point where four cells meet is to be considered the point of symmetry for purposes of the present invention. Every cell may then be indicated by a point on this X-Y coordinate system. See FIG. 8. For example, the two cells shaded in FIG. 4 are at coordinate point X=+2, Y=+1, (+2, +1), and at coordinate point X=−2, Y=−4 (−2, −4). The two shaded cells in FIG. 9 are at coordinate points X=+3, Y=+2 (+3, +2), and at coordinate point X=−2, Y=−1 (−2, −1).

As can be seen in FIGS. 6 and 7, with every cell in the core 101 thus defined, all the cells with corresponding control rods may be defined as follows. The A1 control rods may be defined as all control rods having X-Y coordinates with X equal to a positive or negative odd number and Y equal to a positive or negative odd number. The A2 control rods may be defined as all control rods having X-Y coordinates with X equal to zero or a positive or negative even number and Y equal to zero or a positive or negative even number. The B1 control rods may be defined as all control rods having X-Y coordinates with X equal to zero or a positive or negative even number and Y equal to a positive or negative odd number. Finally, the B2 control rods may be defined as all control rods having X-Y coordinates with X equal to a positive or negative odd number and Y equal to zero or a positive or negative even number.

Figure 10A:
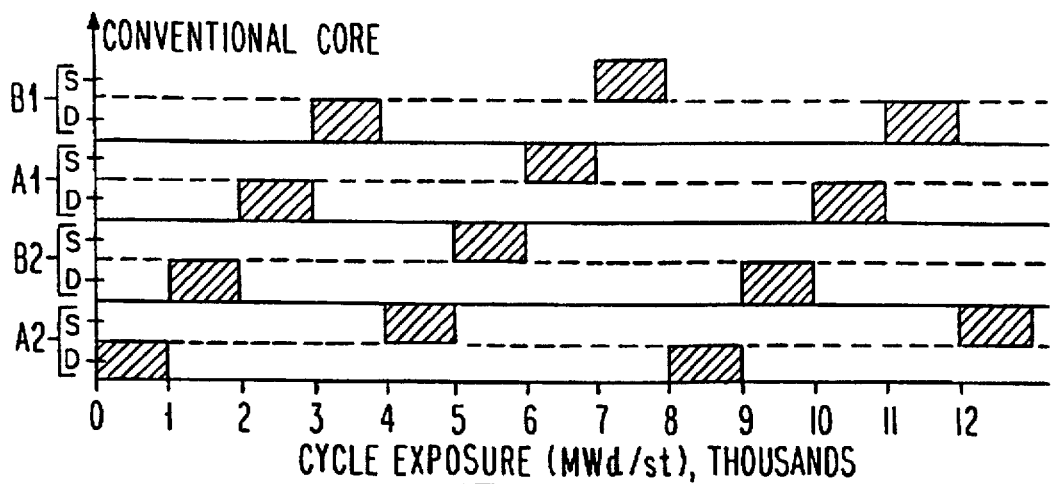
FIGS. 10A, 10B, and 10C are time domain representations of typical control rod programming time lines for conventional core (prior art), control cell core (prior art), and improved low leakage core of the present invention.
Figure 10B:
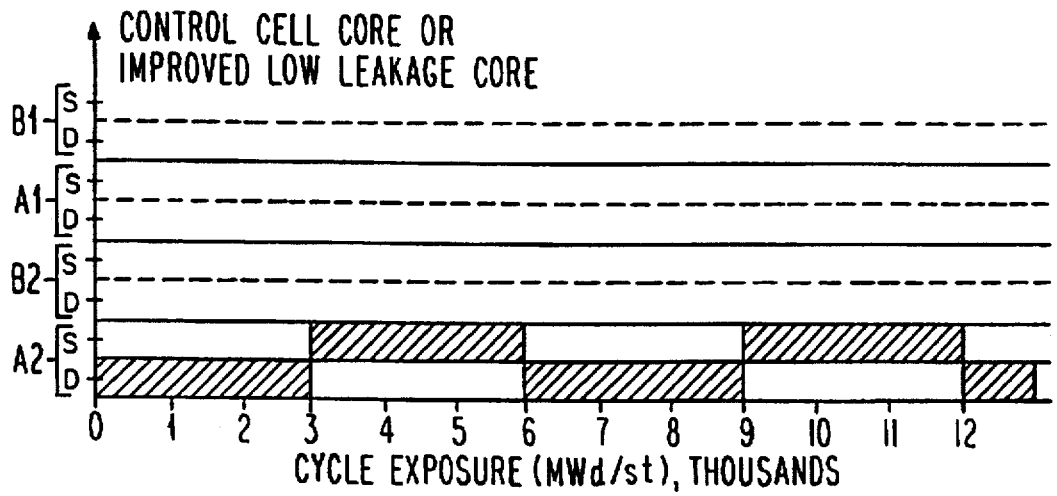
Figure 10C:
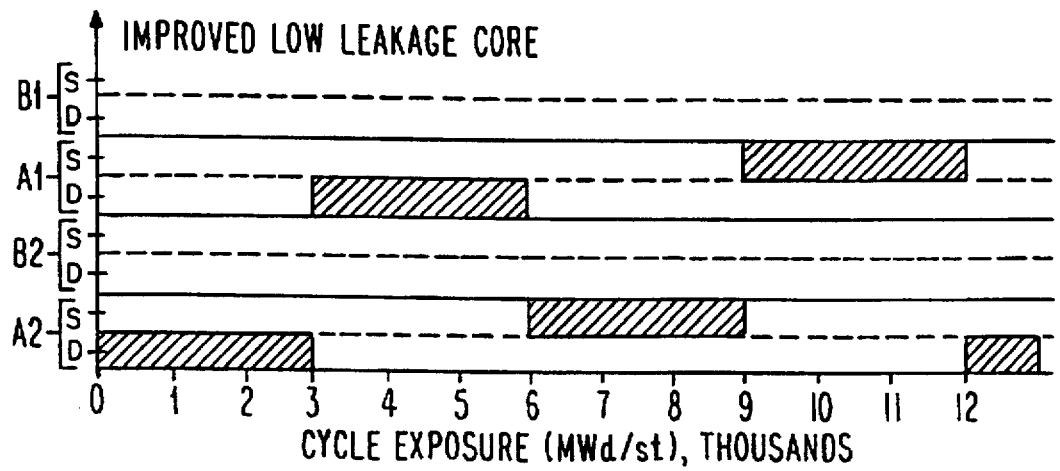

Based on the above-defined groupings, the present invention accomplishes its substantial efficiency by withdrawing and inserting these control rods 120 in accordance with the preselected sequences of the present invention. As can be seen in FIG. 10C, an example of one such sequence is shown in the bottom time line plot, indicated Improved Low Leakage Core. In this figure, the Y-axes are labeled with A2, B2, A1, and B1. These refer to the control rods that may be at least partially inserted into the core at power during the desired time interval, generally all other control rods typically being fully withdrawn, as explained in detail below.

In this preferred embodiment, each of the four groups of control rods may be split into subgroups "S" and "D" indicating shallow and deep respectively as will also be explained in detail below. On the X-axis (time axis), a typical nuclear reactor operating cycle is indicated in typical units of cycle exposure. The reactor operating cycle is typically divided into several time intervals, generally approximately equal in length during which only one of the above four groups of control rods is at least partially inserted in the core. As can be seen in FIGS. 10A, 10B, and 10C which show operating cycles for the present invention, as well as those for a typical conventional core and a typical control cell core, a typical time interval between interchange (swapping) of control rod pattern groups for the present invention, is substantially longer than that of the time interval for conventional core. The time interval for the present invention is also equal to or may be longer than that of control cell core, however, the core loading pattern of the present invention is substantially more neutronically efficient. A significant reduction in operational complexity is thus achieved by having fewer reactor maneuvers and reduced down time associated with swapping of control rod pattern groups, over that of a typical conventional core design. For the improved low leakage core design of the current invention, typically there may be a requirement for rod pattern swaps only approximately every 3000 megawatt-days per standard ton of fuel (MWd/st), rather than 1000 MWd/st as may be required for conventional core design (see FIG. 10A). Thus, as shown in this example, during power operation, generally all of the A2 rods are at least partially inserted into the core for the first 3000 MWd/st, while all other rods are generally withdrawn from the core. Next, for the following 3000 MWd/st, generally all of A2 rods are withdrawn from the core and generally all of the A1 rods are at least partially inserted into the core. Next, for the next 3000 MWd/st, generally all of the A2 rods are at least partially inserted into the core while generally all of the remaining rods are withdrawn from the core. Finally, for the next 3000 MWd/st, generally all of the A1 rods are at least partially inserted into the core while generally all of the remaining rods are withdrawn from the core. This pattern of operation may then be repeated until the reactor operating cycle is complete.

For the improved low leakage core design of the current invention, this desired time interval between rod pattern swaps (in the above example 3000 MWd/st) can be substantially shortened or extended (extended to its theoretical limit, up to approximately 12,000 MWd/st, i.e. an operation cycle), depending on reactor core requirements. At its limit, this desired time interval could be extended to be the time duration of the power cycle of the reactor, or, for example, two years. However a time interval of, for example, greater than 2000 MWd/st yields substantial savings.

An example of the "deep" and "shallow" subgroups is as follows. A fully inserted rod will be defined for the purposes of the present invention as being at notch position 0, while a fully withdrawn rod will be defined as being at notch position 48. A halfway inserted rod is thus at notch position 24 and a three-fourths inserted rod is thus at notch position 12. As can be seen in FIGS. 11A, 11B, 11C, and 11D, examples of notch positions are shown on the left column with corresponding deep (D) and shallow (S) position designations shown in the right hand column. Blanks indicate control rods which are fully withdrawn. For example, in FIG. 11A, the control rod positions of the A2 rods are shown in a "deep" (i.e. the center rod is in the "deep" subgroup) position. In this configuration, the control rods are inserted in subgroups or "waves", with the center rod being inserted deeply into the core at position 8, the first radial wave outward being shallow at 40, the second radial wave outward being deep at 10, the third radial wave being shallow at 36 and 40, and the fourth radial wave being deep at 12. Note that only one quarter of the cross-section of the core is shown and that the core is symmetric about the center cell having its control rod at position 8. In FIG. 11B, the A2 rods are shown in the "shallow" (i.e. the center rod is in the "shallow" subgroup) position, where the control rod of the central cell is inserted to shallow position 36. Here, again, the A2 control rods are inserted with the first radial wave from the center being deep at 14, the second radial wave being shallow at 40, the third radial wave being deep at 10 and 18, and the fourth radial wave being shallow at 38. FIGS. 11C and 11D indicate similar examples for A1, deep, and B2 deep. One skilled in the art of core design is able to determine the precise notch position required for each control rod.

Note also that the use of "deep" and "shallow" rod subgroups within each of the four control rod groups (A1, A2, B1, B2) is generally found to yield satisfactory reactor core performance. However, it is often necessary to depart from this deep/shallow subgroup philosophy in practice (i.e. a rod in the "shallow" subgroup will be inserted to a "deep" position, and vice versa). Equally satisfactory reactor core performance is often found to be achievable in cases of this nature.

In the above examples, and in particular regarding FIGS. 10A, 10B, and 10C, the order of actuation of the groups of control rods is not critical. As seen in the Improved Low Leakage Core plot in FIG. 10C, the sequence of control rod group insertion was by steps A2 deep, A1 deep, A2 shallow, A1 shallow. These steps may be taken in any order. Moreover, the use of the A1 and A2 rods can be substituted with use of the B1 and B2 rods, or with any combination of groups, without substantial deleterious effect.

Moreover, not all control rods 120 in a particular group of control rods (A1, A2, B1, B2) are required to be inserted when a particular group is designated. Core reactivity constraints or proximity to licensing limits, and the like may require at least some of the designated control rods to be fully withdrawn. Moreover, there is also an occasional need to insert one or more control rods that are not in the designated group. However, most of the control rods in the designated group are usually at least partially inserted.

In a second preferred embodiment, the improved low leakage core design of the present invention my also use any one of the four groups of rods, A1, A2, B1, B2, for example, by inserting those selected rods to a "deep" position for the first 3000 MWd/st with generally all other rods removed from the core, then inserting those rods to a "shallow" position for the next 3000 MWd/st then repeating this same pattern until the fuel cycle is over. Again, here, any single group my be used, and the rod positioning may also begin in the "shallow" position for the first 3000 MWd/st, then move to the "deep" position for the next 3000 MWd/st, etc. This embodiment is illustrated in FIG. 10B.

The control rod programming for the improved low leakage core design of the present invention has the benefits of control cell core rod programming in that a relatively small number of control rods 120 are used at power, and these rods have a relatively low frequency of control rod pattern swaps throughout the nuclear fuel cycle. Thus, improved low leakage core design involves an efficient method of control rod programming with low operational complexity.

Using the improved low leakage core design, thermal limit margins will not be a major design constraint. When using a 9×9 or larger lattice fuel pin array rather than the 8×8, or smaller lattice fuel pin array of previous designs, margins to thermal limits, such as linear heat generation rate are increased since power is spread over a larger number of pins. Additionally, thermal limit margins have also been improved by the use of radially and axially varying burnable poison and U-235 distributions in the fuel assembly and by advances in fuel assembly design and in fuel assembly and core analysis capability.

As indicated above, a large number of control rod pattern interchanges or swaps required during the operating cycle results in an increase in operational complexity; and the reactor power reduction necessitated by these control rod pattern swaps results in a decrease in overall plant capacity factor due to the need to reduce reactor power throughout the duration of the swap. Also, when all four rod groups are used, the large number of control rods which are inserted at intervals during power operation throughout the operating cycle may result in a control blade burnup penalty, as relatively larger numbers of control blades are depleted past their end-of-life criteria. Furthermore, control rod pattern swaps excite spatial power distribution xenon transients which can reduce margin to thermal limits, make reactor operation undesirably complex, and increase the probability of operator error. The present invention minimizes these control rod pattern swaps while maintaining the high neutronic efficiency of a core having a loading pattern similar to a conventional core design.

It should be recognized that there exist many possible control rod withdrawal and insertion patterns and sequences for controlling nuclear reactors. However, the present invention is based on a unique combination of patterns and pattern sequences and core loading pattern that has been found particularly advantageous for the control of nuclear reactors.

The figures pertaining to this description depict a core having 185 fuel cells, however, the invention would also apply equally well to a core having significantly fewer or significantly more cells.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

I claim:

1. A method of fueling and operating a nuclear reactor core having a plurality of fuel cells arranged in a generally symmetric matrix having a single central point of symmetry at the center of said core, each cell including a plurality of individually replaceable fuel assemblies and a selectively insertable control rod, each fuel assembly having a plurality of fuel rods, said plurality of fuel assemblies in each cell surrounding said control rod in each cell, wherein said fueling and operating said nuclear reactor core for a power operation cycle comprises the steps of:

a. fueling said nuclear reactor core by shutting down said reactor after each successive power operation cycle for replacement of a fraction of the fuel assemblies in said core and relocation of a fraction of said fuel assemblies in said core, comprising the steps of:
  i. designating a central core region, a buckled core region and a peripheral core region, each said region comprising a plurality of fuel cells, each fuel cell in said central core region and said buckled core region comprising four fuel assemblies arranged in a two-by-two square;
  ii. placing at least two fuel assemblies of relatively high reactivity with reactivity equivalent of approximately 3.4 weight percent fissile material or greater with commensurate burnable poison loading in substantially all fuel cells in said central core region; and
  iii. placing fuel assemblies of relatively low reactivity with reactivity equivalent of approximately 1.8 weight percent fissile material or lower with commensurate burnable poison loading in said cells in said peripheral core region; and b. operating said nuclear reactor core throughout a power operation cycle comprising the sequential steps of:
  i. designating said control rods in said matrix as a two times X by two times Y array where X generally equals Y, and said point of symmetry being a central point at X equals zero and Y equals zero;
  ii. designating a first group of control rods as substantially all control rods in said central core region and said buckled core region at positions where X is equal to a positive or negative odd number and Y is equal to a positive or negative odd number;
  iii. designating a second group of control rods as substantially all control rods in said central core region and said buckled core region at positions where X is equal to zero or a positive or negative even number and Y is equal to zero or a positive or negative even number;
  iv. designating a third group of control rods as substantially all control rods in said central core region and said buckled core region at positions where X is equal to zero or a positive or negative even number and Y is equal to a positive or negative odd number;
  v. designating a fourth group of control rods as substantially all control rods in said central core region and said buckled core region at positions where X is equal to a positive or negative odd number and Y is equal to zero or a positive or negative even number;
  vi. selecting one group of said four groups of control rods;
  vii. selecting a desired time interval for insertion of the designated group of control rods during the power operation cycle;
  viii. actuating the designated group of control rods to positions at least partially inserted into said core and actuating all control rods not in the designated group to positions substantially fully withdrawn from said core for the desired time interval;
  ix. selecting a second group of said four groups of control rods;
  x. actuating said second designated group of control rods to positions at least partially inserted into said core and actuating all control rods not in the designated group to positions substantially fully withdrawn from said core for the desired time interval; and
  xi. sequentially repeating said actuation steps for each remaining desired time interval for the duration of the nuclear reactor power operation cycle utilizing the selected first and second groups of control rods.

2. The method of fueling and operating a nuclear reactor core of claim 1, wherein the step of fueling said nuclear reactor having the step of replacement and relocation of fuel assemblies includes utilizing fuel assemblies in arrays that are larger than 8 fuel rods by 8 fuel rods in said central and said buckled regions of the said core.

3. The method of fueling and operating a nuclear reactor core of claim 1, wherein the step of fueling said nuclear reactor by the step of placing at least two fuel assemblies of relatively high reactivity in substantially all fuel cells includes placing at least two fresh fuel assemblies of relatively high reactivity in substantially all fuel cells in said central core region.

4. The method of fueling and operating a nuclear reactor core of claim 1, wherein the step of fueling said nuclear reactor by the step of placing fuel assemblies of relatively low reactivity in said peripheral core region includes placing fuel assemblies that have the lowest reactivity of all fuel assemblies available for use from previous power operation cycles in the reactor.

5. The method of fueling and operating a nuclear reactor core of claim 1, wherein the step of selecting a desired time interval includes selecting a time interval greater than approximately 2000 MWd/st.

6. A method of fueling and operating a nuclear reactor core having a plurality of fuel cells arranged in a generally symmetric matrix having a single central point of symmetry at the center of said core, each cell including a plurality of individually replaceable fuel assemblies and a selectively insertable control rod, each fuel assembly having a plurality of fuel rods, said plurality of fuel assemblies in each cell surrounding said control rod in each cell, wherein said fueling and operating said nuclear reactor core for a power operation cycle comprises the steps of:

a. fueling said nuclear reactor core by shutting down said reactor after each successive power operation cycle for replacement of a fraction of the fuel assemblies in said core and relocation of a fraction of said fuel assemblies in said core, comprising the steps of:
  i. designating a central core region, a buckled core region and a peripheral core region, each said region comprising a plurality of fuel cells, each fuel cell in said central core region and said buckled core region comprising four fuel assemblies arranged in a two-by-two square;
  ii. placing at least two fuel assemblies of relatively high reactivity with reactivity equivalent of approximately 3.4 weight percent fissile material or greater with commensurate burnable poison loading in substantially all fuel cells in said central core region; and
  iii. placing fuel assemblies of relatively low reactivity with reactivity equivalent of approximately 1.8 weight percent fissile material or lower with commensurate burnable poison loading in said cells in said peripheral core region; and
b. operating said nuclear reactor core throughout a power operation cycle comprising the sequential steps of:
  i. designating said control rods in said matrix as a two times X by two times Y array where X generally equals Y, and said point of symmetry being a central point at X equals zero and Y equals zero;
  ii. designating a first group of control rods as substantially all control rods in said central core region and said buckled core region at positions where X is equal to a positive or negative odd number and Y is equal to a positive or negative odd number;
  iii. designating a second group of control rods as substantially all control rods in said central core region and said buckled core region at positions where X is equal to zero or a positive or negative even number and Y is equal to zero or a positive or negative even number;
  iv. designating a third group of control rods as substantially all control rods in said central core region and said buckled core region at positions where X is equal to zero or a positive or negative even number and Y is equal to a positive or negative odd number;
  v. designating a fourth group of control rods as substantially all control rods in said central core region and said buckled core region at positions where X is equal to a positive or negative odd number and Y is equal to zero or a positive or negative even number;
  vi. selecting one group of said four groups of control rods;
  vii. selecting a desired time interval for insertion of the designated group of control rods during the power operation cycle;
  viii. actuating said control rods in said designated group of control rods to first positions at least partially inserted into said core and actuating all control rods not in said designated group to positions substantially fully withdrawn from said core for the desired time interval;
  ix. actuating said control rods in said designated group of control rods to second positions at least partially inserted into said core and actuating all control rods not in said designated group to positions substantially fully withdrawn from said core for the desired time interval; and
  x. sequentially repeating said actuation steps for each remaining desired time interval for the duration of the nuclear reactor power operation cycle utilizing the selected one group of control rods.

7. The method of fueling and operating a nuclear reactor core of claim 6, wherein the step of fueling said nuclear reactor having the step of replacement and relocation of fuel assemblies includes utilizing fuel assemblies in arrays that are larger than 8 fuel rods by 8 fuel rods in said central and said buckled regions of the said core.

8. The method of fueling and operating a nuclear reactor core of claim 6, wherein the step of fueling said nuclear reactor by the step of placing at least two fuel assemblies of relatively high reactivity in substantially all fuel cells includes placing at least two fresh fuel assemblies of relatively high reactivity in substantially all fuel cells in said central core region.

9. The method of fueling and operating a nuclear reactor core of claim 6, wherein the step of fueling said nuclear reactor by the step of placing fuel assemblies of relatively low reactivity in said peripheral core region includes placing fuel assemblies that have the lowest reactivity of all fuel assemblies available for use from previous power operation cycles in the reactor.

10. The method of fueling and operating a nuclear reactor core of claim 6, wherein the step of selecting a desired time interval includes selecting a time interval greater than approximately 2000 MWd/st.

* * * * *